US00RE35955E

United States Patent [19]

Lu

[11] E Patent Number: Re. 35,955

[45] Reissued Date of Patent: Nov. 10, 1998

[54] HOLLOW CLUB HEAD WITH DEFLECTING INSERT FACE PLATE

[76] Inventor: Clive S. Lu, 282 Newbridge Rd., Hicksville, N.Y. 11801

[21] Appl. No.: 774,070

[22] Filed: Dec. 23, 1996

Related U.S. Patent Documents

Reissue of:

[64] Patent No.: 5,499,814
Issued: Mar. 19, 1996
Appl. No.: 303,249
Filed: Sep. 8, 1994

[51] Int. Cl.[6] ..... A63B 53/04

[52] U.S. Cl. ..... 473/329; 473/342; 473/345

[58] Field of Search ..... 473/329, 330, 473/331, 342, 350, 345, 346

[56] References Cited

U.S. PATENT DOCUMENTS

| | | | |
|---|---|---|---|
| 819,900 | 5/1906 | Martin | 273/78 |
| 2,040,252 | 5/1936 | Farrington | 273/78 |
| 3,211,455 | 10/1965 | Hyden | 273/78 |
| 3,226,120 | 12/1965 | Borah | 273/83 |
| 3,814,437 | 6/1974 | Winquist . | |
| 3,989,248 | 11/1976 | Campau | 273/173 |
| 4,213,613 | 7/1980 | Nygren . | |
| 4,214,754 | 7/1980 | Zebelean . | |
| 4,398,965 | 8/1983 | Campau | 473/329 |
| 4,511,145 | 4/1985 | Schmidt . | |
| 4,681,321 | 7/1987 | Chen et al. . | |
| 5,000,454 | 3/1991 | Soda . | |
| 5,026,056 | 6/1991 | McNally et al. . | |
| 5,067,715 | 11/1991 | Schmidt et al. . | |
| 5,106,094 | 4/1992 | Desbiolles et al. | 273/167 H |
| 5,141,230 | 8/1992 | Antonious . | |
| 5,180,166 | 1/1993 | Schmidt et al. . | |
| 5,242,167 | 9/1993 | Antonious . | |
| 5,255,918 | 10/1993 | Anderson et al. | 273/167 H |
| 5,261,664 | 11/1993 | Anderson | 273/78 |
| 5,271,621 | 12/1993 | Lo | 273/167 H |
| 5,288,070 | 2/1994 | Chen | 273/167 H |
| 5,290,032 | 3/1994 | Fenton et al. . | |
| 5,301,941 | 4/1994 | Allen . | |
| 5,346,219 | 9/1994 | Pehoski et al. | 273/78 |
| 5,431,396 | 7/1995 | Shieh | 273/78 |
| 5,433,440 | 7/1995 | Lin | 273/78 |
| 5,447,311 | 9/1995 | Viollaz et al. | 473/329 |
| 5,494,281 | 2/1996 | Chen | 473/329 |
| 5,505,453 | 4/1996 | Mack | 273/186.2 |

FOREIGN PATENT DOCUMENTS 0285844 10/1988 European Pat. Off. .

OTHER PUBLICATIONS

USGA, Rules of Golf, 1989, p. 100.

*Primary Examiner*—William M. Pierce
*Attorney, Agent, or Firm*—Aquilino & Welsh

[57] ABSTRACT

A head for a golf club includes a body shell, a face plate held on the body shell for striking the golf ball and an internal element mounted in the body shell for reinforcing the face plate. More specifically, the face plate is deflectable from a static position to a striking position as a result of stress produced when striking the golf ball. Further, a mechanism is provided for maintaining a gap between the reinforcing element and the face plate when the face plate is in a static position so as to provide a cushioning effect immediately upon striking the golf ball. *The club head having a face plate mounting assembly in the form of a channel on the body shell, a cooperating lug on the face plate for receipt in the channel and a mounting flange on the body shell for capturing the lug within the channel.*

15 Claims, 2 Drawing Sheets

10
12
24
16
34
32
30
14

23
12
30
14
G
34
32
20
36
18
36
22

23
12
14
30
G
34
36
32
20
36
22

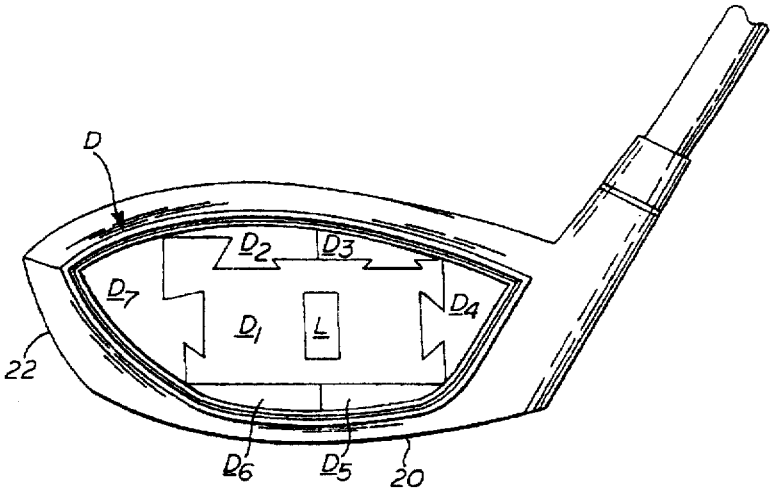
Fig. 3
Fig. 4
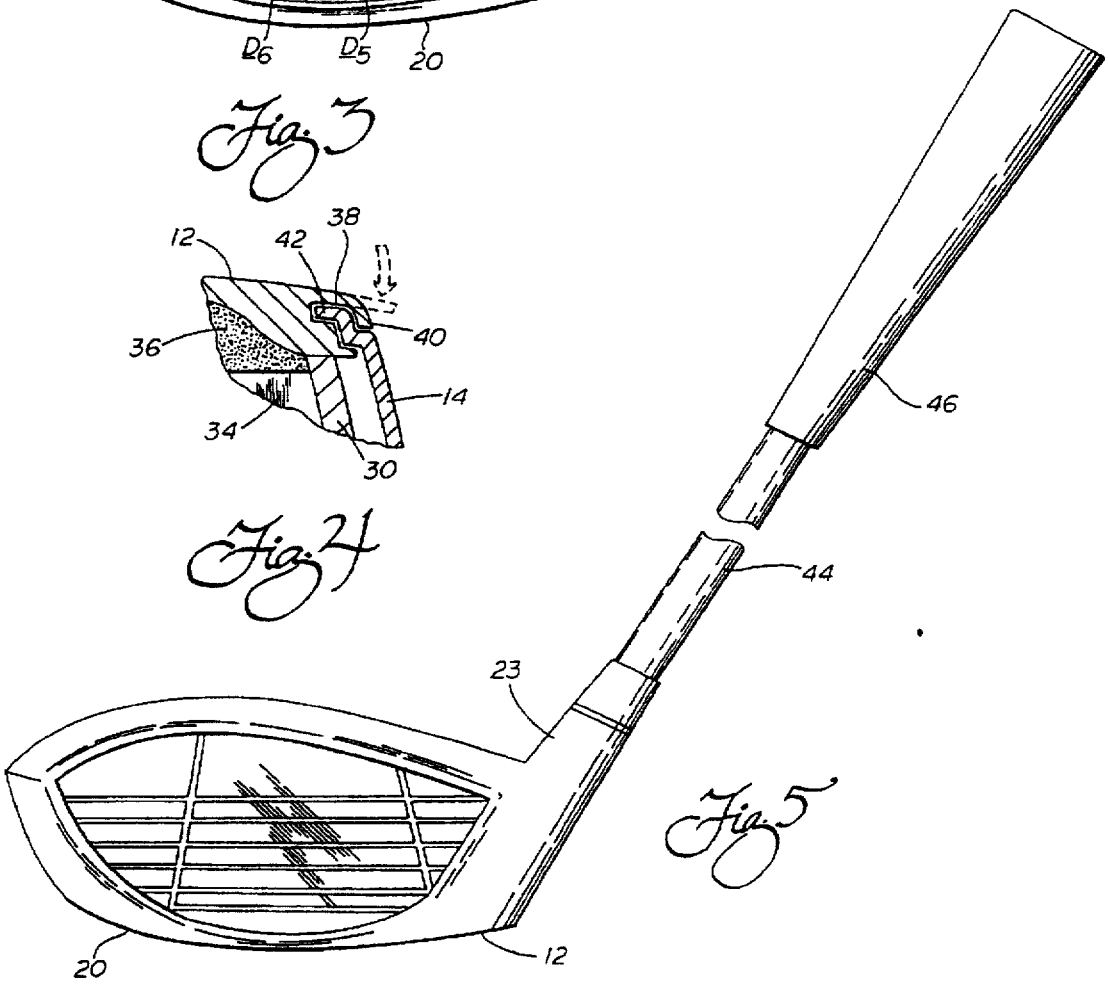
Fig. 5

HOLLOW CLUB HEAD WITH DEFLECTING INSERT FACE PLATE

Matter enclosed in heavy brackets [ ] appears in the original patent but forms no part of this reissue specification; matter printed in italics indicates the additions made by reissue.

TECHNICAL FIELD

The present invention relates generally to the field of golf and, more particularly, to an improved design and construction of a golf club.

BACKGROUND OF THE INVENTION

Golf is a skill sport wherein a constant goal is to improve ones level of play. Such improvement may be achieved in two ways. The first is by improving the ability and skill of the individual golfer. The second is by improving the performance of the equipment including both the golf balls and the golf clubs used to strike the golf balls. The present invention relates to the desire to provide improved golf clubs characterized by superior weight distribution that promotes longer, straighter shots even for off-center hits and improved "feel" that allows for better control of the flight of the golf ball by the player.

The desire to provide golf clubs exhibiting enhanced performance and, accordingly, a competitive edge has been a driving force in the golf club industry for years. Improvements in the design of golf clubs include "cavity back" irons to provide better weight distribution and a larger sweet spot for striking the ball and "metal woods" that allow better weight distribution and presentation of a larger sweet spot for increases in both directional accuracy and driving distance.

Despite a large number of significant advances having been made in golf club design over the years, further improvements in performance are still desired and are possible. In this regard, one area of golf club design in ready need of improvement is the club face and the channeling and distribution of the stress through the golf club at the moment of and immediately after the impact with the golf ball. It is to this aspect of golf club design which the present invention relates.

SUMMARY OF THE INVENTION

Accordingly, it is a primary object of the present invention to provide a golf club of relatively simple design that is adapted to provide reliable and dependable performance over a long service life.

Another object of the present invention is to provide a head for a golf club incorporating a minimal number of component parts and utilizing only mechanical connection between those parts for utmost construction integrity. Accordingly, utilization of adhesives, epoxies and welds in the construction of the golf head is avoided.

Yet another object of the invention is to provide a head for a golf club incorporating a unique, deflectable face plate for striking a golf ball and a cooperating element for reinforcing that face plate. The plate and reinforcing element are mounted to a body shell so as to provide a gap therebetween. This gap initially provides cushioning upon impact with the golf ball so as to improve feel. The gap further functions in the manner of a spring, creating a snap action at impact so as to provide better power and longer hitting distances. The gap also serves to effectively decouple a significant portion of the overall club head mass from direct contact with the golf ball at the instant of impact with the face plate This insures straighter, truer shot making.

Yet another object of the invention is to provide a head for a golf club and a golf club incorporating a minimum number of component parts that are specifically designed to maximize perimeter weighting. In this way, a more "forgiving" golf club is provided that produces straighter shots even when a golf ball is miss hit by striking the ball on the club face near the toe or heel a significant distance from the center-of-gravity.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved head is provided for a golf club. The golf club head incorporates a body shell and a face plate held on the body shell for striking a golf ball. The face plate is deflectable from a static position to a striking position as a result of the stress produced when striking the golf ball.

The golf club head further includes an element mounted on the body shell for reinforcing the face plate. This is done by means of engagement with the face plate when the face plate is in the striking position. Further, means are provided for maintaining a gap between the reinforcing element and the face plate when the face plate is in the static position. This gap may be filled with air, foam or other resilient material so as to provide a spring-like cushioning effect immediately upon the striking of the golf ball. This improves the feel of the club and adds to the confidence of the golfer. Further, as will be described in greater detail below, the resulting snap action provides an impression of increased power and produces longer hitting distances. Additionally, the gap effectively decouples a significant portion of the weight of the club head from the golf ball at the very instant of impact of the golf ball with the face plate. Thus, at that moment less mass is in direct contact with the golf ball and, accordingly, in the instance of an off-center hit less slice or hook spin is produced. As a result, straighter, truer shot making is achieved.

More specifically, the body shell of the golf club head is preferably integrally cast utilizing an investment casting process. Accordingly, the body shell includes an integral cast top, sole and side wall. Only a single opening remains.

The reinforcing element is then introduced into the body shell through this opening. Preferably, the reinforcing element incorporates a support plate for engaging the face plate when the face plate is in the striking position, an arched backing plate for engaging the body shell and ribs for connecting the arched backing plate and support plate together. A plurality of spaced ribs are preferably utilized as they provide the necessary strength while adding little mass. Advantageously, the resulting mass savings may be redistributed around the perimeter of the body shell for additional benefits while still maintaining an equivalent swing weight. The reinforcing element may be held in position in the body shell by means of polyurethane foam, a mechanical wedge and/or other appropriate means known in the art for such a purpose.

The face plate is mounted on the body shell to close the opening. A completely mechanical mounting is preferably utilized in place of the relatively weak and less desirable adhesive, epoxy and welding connections utilized in prior art head designs. More particularly, the integral body shell of the club head is cast to include a z or s-shaped channel and an associated bendable mounting flange both about the perimeter of the body shell opening. The face plate also includes a cooperating z or s-shaped lug about its entire perimeter. The z-shaped lug is sized for insertion into and receipt within the z-shaped channel of the body shell. The mounting flange is then bent over to close the z-shaped channel and capture the mounting lug thereby mechanically securing the face plate and body shell together.

It should further be appreciated that the mountings of the reinforcing element and face plate to the body shell cooperatively function to maintain a gap between the reinforcing element and the face plate when the face plate is in the static position. Preferably, this gap is between 0.001 and 0.3 inches in thickness. It may be filled with air or other resilient material to provide a cushioning effect at the moment of impact with a golf ball.

Additionally, it is preferred that the face plate be constructed from a material that is deflectable from the static position to the striking position as a result of the stress produced while striking a golf ball. Upon reaching the striking position the face plate engages and is reinforced by the reinforcing element thereby resisting further deflection and transferring full energy to the golf ball. To achieve this end it is preferred that the face plate be constructed from various metals, nonmetals and composite materials having a thickness of between 0.01–0.30 inches. Further, the face plate should have a tensile strength between 40.0–250.0 ksi and/or provide a minimum yield strength of between 40.0 ksi and a modulus of elasticity of between $10\times10^3$–$20\times10^3$ ksi.

In accordance with yet another aspect of the present invention, a golf club is provided incorporating a golf club head as just described. Specifically, such a golf club includes a shaft constructed of material with an appropriate flexibility including, but not limited to titanium, graphite/boron and stainless steel. The shaft includes a proximal end and a distal end. A handle or grip of a type of construction known in the art is received over the proximal end and the club head as described is received and mounted to the distal end.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description search to explain the principles of the invention. In the drawing:

FIG. 3 is a schematical front elevational view showing the multi-piece tool die used to form the interior wall or hollow section of the club head;

FIG. 4 is a detailed view showing the mounting of the face plate to the body shell; and FIG. 5 is a partially cut away, perspective view of a golf club constructed in accordance with the teachings of the present invention.

Figures 1, 2A, 2B:
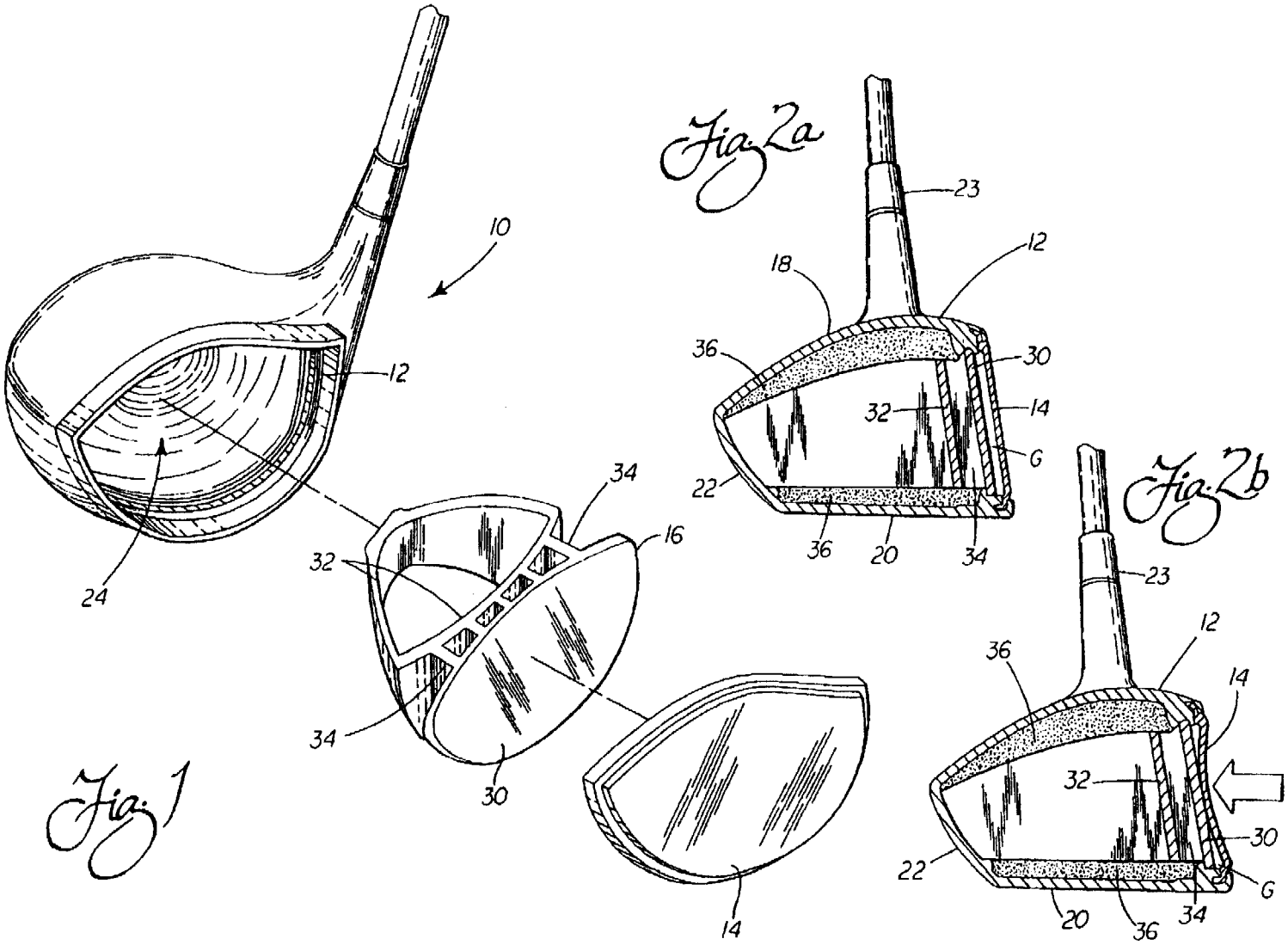
FIG. 1 is an exploded view of a head for a golf club constructed in accordance with the teachings of the present invention.
FIG. 2a is a cross-sectional view of the head shown in FIG. 1 showing the gap present between the reinforcing element and the face plate when the face plate is in the static position.
FIG. 2b is a cross-sectional view along the same line as FIG. 2a which showing the relative position of the reinforcing element and the face plate when the face plate is deflected into the striking position upon striking a golf ball.

Reference will now be made in detail to the present preferred embodiment of the invention, an example of which is illustrated in the accompanying drawing.

DETAILED DESCRIPTION OF THE INVENTION

Reference is now made to FIGS. 1, 2a and 2b showing in detail the head 10 of the present invention for a golf club. As shown, the head 10 includes a body shell 12, a face plate 14 held on the body shell for striking a golf ball and a reinforcing element 16 mounted within the body shell behind the face plate.

The body shell 12 may be formed from any appropriate material but preferably is cast from metal utilizing an investment casting process so as to include an integral top wall 18, sole 20, side wall 22 and hosel 23. Only an opening 24 remains. More particularly, in a accordance with the investment casting process, a master pattern of the club head is made and a master die is produced from this pattern. In this instance, the master die actually comprises an outer two-piece die (not shown) and a cooperating inner, multi-piece tool die D (see FIG. 3) for forming the interior, or hollow section of the body shell 12. Further, a high temperature ceramic dowel W is positioned to form the inner wall of the integral hosel 23. Molten wax is injected into the cooperating dies to form a wax pattern P of the club head 10.

Once the wax hardens, the outer die is separated and the associated inner multi-piece tool die D and dowel W are removed from the wax pattern P. Specifically, it should be appreciated that the hollow inner cavity of the body shell 12 of the wax pattern P is larger than the striking face opening 24 through which the inner tool die elements extend. Accordingly, the die members must be removed in a particular order. With reference to FIG. 3, the central element $D_1$, including the lug L is removed first by withdrawing from the remaining tool elements through the face plate opening 24 in the wax pattern P. Next, the element $D_2$ is laterally shifted toward the center of the opening 24 and then withdrawn in the same manner. Element $D_3$ is then manipulated in the same manner. This leaves the necessary clearance to laterally shift the elements $D_4$, $D_5$, $D_6$ and $D_7$, one element at a time, towards the center of the opening 24 where they too may be withdrawn from the body shell 12 of the wax pattern P. The wax pattern P is then dipped into a thin slurry of finely ground refractory. This produces a thin but very smooth layer of investment material adjacent to the wax pattern P on both the inner and outer surfaces and insures a smooth surface and good detail in the final product. If desired, repeated dipping can be utilized to increase the thickness of the coating.

Next, the coated wax pattern P is positioned in a flask partially filled with investment material. Additional investment material is then poured into the flask around and into the wax pattern. The container is vibrated to remove any entrapped air and settle the investment material around the wax pattern P. The investment material is then allowed to harden.

Subsequent to this, the wax pattern P is permitted to melt and run out of the mold. The mold is then preheated in preparation for pouring of the molten metal or other material from which the head 10 is to be formed. Various methods beyond simple pouring may be utilized to insure complete filling of the mold. After hardening, the casting is removed from the mold by breaking loose the investment material.

The reinforcing element 16 may be formed from any appropriate material having relatively high strength and relatively low mass. Preferably, aluminum alloy or plastic such as nylon is utilized. As best shown in FIG. 1, the reinforcing element 16 comprises a support plate 30 for backing the face plate 14, an arched backing member 32 for engaging the body shell 12 and a series of spaced ribs 34 for connecting the arched backing member to the support plate. The reinforcing element 16 may be integrally formed as a unit or joined together from individual component parts.

The reinforcing element 16 is inserted into the body shell 12 through the face plate opening 24. More specifically, the opening 24 provides sufficient clearance to allow the reinforcing elements 16 to be inserted in position with the arched backing member 32 seating against the interior wall of the body shell 12. The reinforcing element 16 is then secured in position by any means known in the art appropriate for that purpose. For example, when the reinforcing element 16 is seated and held in proper position in the body shell 12, polyurethane foam 36 may be injected through an orifice (not shown) in the support plate 30. As the foam 36 expands it fills the space between the support plate 30 and the arched backing member 32 around the ribs 34 so as to provide a tight friction fit. Of course, other methods of anchoring may be utilized including but not limited to fasteners extending through the wall of the body shell 12 into engagement with the reinforcing element 16 and/or a mechanical wedge between the body shell and reinforcing element to bind them together.

Once the reinforcing element 16 is secured in position in the body shell 12, the face plate 14 is anchored in position across the opening 24. Since adhesive, epoxy and welded joints are relatively weak when compared to the surrounding material and therefore prone to stress concentration and failure, a completely mechanical mounting is utilized. More particularly, as best shown in detail in FIG. 4, the body shell 12 includes an integrally cast z-shaped channel 38 (with a shoulder angle A between 70°–89°) and an associated bendable mounting flange 40. Both of these structures are provided about the peripheral margin of the body shell opening 24. The face plate 14 also includes a cooperating z-shaped lug 42 about the entire perimeter of the face plate.

When mounting the face plate 14 to the body shell 12, the face plate is heated, causing an expansion so that the z-shaped lug 42 is of sufficient dimension to be inserted into and received in the z-shaped channel 38 of the body shell 12. As the face plate 14 subsequently cools, it contracts to provide a tight frictional fit. For further security, the mounting flange 40 is then bent over to close the z-shaped channel 38 and capture the mounting lug 42 in position.

In accordance with an important aspect of the present invention, it should be appreciated that the face plate 14 is constructed to withstand the stress of impact with a golf ball while providing for some limited deflection from the static position shown in FIG. 2a to the striking position shown in FIG. 2b.

To achieve this end, the face plate 14 may be constructed from materials selected from a group consisting of metals, non-metals and composites. Such materials include but are not limited to various stainless steels, titanium alloys, various composite materials incorporating boron, various types of natural wood and various graphite materials as well as those incorporating a woven fiber mesh such as KEVLAR. In order to provide the necessary strength to withstand the impact of the golf ball while also providing the desired amount of deflection, the material utilized preferably has a tensile strength of between 40.0–250.0 ksi and a thickness of between 0.01–0.30 inches. The face plate also preferably has a minimum yield strength of 40.0 ksi and a modulus of elasticity of between $10\times10^3$ $20\times10^3$ ksi.

As further shown with reference to FIG. 2a, the face plate 14 and reinforcing element 16 are mounted to the body shell 12 so as to maintain a gap G between the rear wall of the face plate and the front wall of the support plate 30 when the face plate is in the static position. Preferably, this gap G is between 0.001 and 0.30 inches in thickness. It may be filled with air as shown in FIG. 2a. Alternatively, other resilient material may be provided in the gap G to provide a spring-like cushioning effect at the instant of impact with a golf ball.

More specifically, at the point of the swing when the face plate 14 strikes the golf ball, the face plate 14 is deflected rearwardly through the gap G. This cushions the blow at the instance of impact thereby improving the feel of the club and increasing the confidence of the golfer. Further, the gap G also effectively functions to decouple a portion of the mass of the golf club in direct contact with the golf ball at the instant of impact. As a result, less slice or hook spin is imparted to the golf ball when the ball is struck off-center relative to the center-of-gravity of the club head 10. As a result, the tendency to slice or hook is reduced thereby allowing the golfer to play more shots to a desired position in the fairway or the green.

As the face plate 14 fully deflects to the ball striking position shown in FIG. 2b, it should be appreciated that the face plate physically engages the support plate 30. Accordingly, the deflection of the face plate is suddenly stopped and a full transfer of energy is made for the first time from the club head to the golf ball. This results in a snap action that provides better power and longer hitting distances. Further, the stress from the impact is communicated rearwardly from the support plate 30 along the ribs 34 to the arched backing member 32. From there it is semi-radially directed about the body shell 12. This semi-radial and substantially equal distribution of stress functions with the cushioning effect of the gap G to provide a significantly enhanced feel for the user of a golf club incorporating the head 10 of the present design. As a result of these real and perceived performance enhancements, the golfer's level of play is significantly enhanced.

As best shown in FIG. 5, the head 10 of the golf club includes a hosel 23 that is adapted for connection to the distal end of an elongated shaft 44. The shaft 44 is constructed of a material with an appropriate flexibility including, but not limited to titanium, graphite/boron and stainless steel. A grip 46 is mounted to the distal end of the shaft 44. The grip is of a type of construction known in the art and may be formed, for example, from leather or rubber. The rubber may include fiber cord or other material to improve the grip of the hands and prevent slipping.

In summary, numerous benefits result from employing the concepts of the present invention. The club head 10 provides increased power and accuracy for longer and straighter shot making. Further, through the (1) synergistic effect of a purely mechanical connection between the face plate 14 and body shell 12, (2) cushioning during deflection of the face plate through the gap G at impact and (3) the further transmission of impact stresses through the support plate 30, ribs 34 and arched backing member 32, the golfer is provided with the necessary feedback to control the flight of the ball and feel confident in his or her shot selection.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, while a golf club head of the "wood" type is described in detail in this specification, the concepts are not limited to specific application thereto and may, in fact, be equally applied to a golf club of the iron type. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

I claim:

1. A head for a golf club, comprising:

a body shell;

a face plate held on said body shell for striking a golf ball, said face plate being deflectable from a static position to a striking position as a result of stress produced when striking a golf ball;

an element mounted on said body shell defining a means for reinforcing said face plate by means of physical engagement with said face plate when said face plate is in said striking position; and means for maintaining a gap between said reinforcing element and said face plate when said face plate is in said static position whereby a cushioning effect is provided immediately upon striking the golf ball.

2. The golf club head set forth in claim 1, wherein said body shell *includes* a cast top, sole and sidewalls.

3. The golf club head set forth in claim [2] *1*, wherein said face plate is constructed from a material selected from a group consisting of metals, nonmetals and composites having a tensile strength of between 40.0–250.0 ksi and a thickness of between 0.01–0.30 inches.

4. The golf club head set forth in claim [3] *1*, wherein said reinforcing element includes:

(1) a support plate for engaging said face plate when said face plate is in said striking position;

(2) an arched backing member; and (3) spaced ribs for connecting said arched backing member to said support plate, said arched backing member and ribs serving to distribute load placed upon said support plate when striking a golf ball.

5. The golf club head set forth in claim [3] *1*, wherein said face plate has a minimum yield strength of 40.0 ksi and a modulus of elasticity of between $10\times10^3$–$20\times10^{3\ +8}$ *ksi*.

6. The golf club head set forth in claim [5] *1*, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.

[7. The golf club head set forth in claim 5, wherein said reinforcing element includes:

(1) a support plate for engaging said face plate when said face plate is in said striking position;

(2) an arched backing member; and (3) spaced ribs for connecting said arched backing member to said support plate, said arched backing member and ribs serving to distribute load placed upon said support plate when striking a golf ball.]

8. A golf club, comprising the head set forth in claim [7] *1*, a flexible shaft having a proximal end and a distal end, and a grip, said head being connected to said distal end of said shaft and said grip being connected to said proximal end of said shaft.

[9. The golf club head set forth in claim 7, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

10. The golf club head set forth in claim [7] *1*, wherein said gap is between 0.001–0.30 inches thick.

[11. The golf club head set forth in claim 10, wherein said gap maintaining means includes means for mounting said reinforcing element to said body shell and means for face plate mounting said face plate to said body shell, said mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[12. A golf club, comprising the head set forth in claim 10, a flexible shaft having a proximal end and a distal end, and a grip, said head being connected to said distal end of said shaft and said grip being connected to said proximal end of said shaft.]

[13. The golf club head set forth in claim 2, wherein said reinforcing element includes:

(1) a support plate for engaging said face plate when said face plate is in said striking position;

(2) an arched backing member; and (3) spaced ribs for connecting said arched backing member to said support plate, said arched backing member and ribs serving to distribute load placed upon said support plate when striking a golf ball.]

[14. The golf club head set forth in claim 2, wherein said gap is between 0.001–0.30 inches thick.]

[15. The golf club head set forth in claim 2, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[16. A golf club, comprising the head set forth in claim 2, a flexible shaft having a proximal end and a distal end, and a grip, said head being connected to said distal end of said shaft and said grip being connected to said proximal end of said shaft.]

[17. The golf club head set forth in claim 1, wherein said face plate is constructed from a material selected from a group consisting of metals, nonmetals and composites having a tensile strength of between 40.0–250.0 ksi and a thickness of between 0.01–0.30 inches.]

[18. The golf club head set forth in claim 17, wherein said gap is between 0.001–0.30 inches thick.]

[19. The golf club head set forth in claim 17, wherein said gap maintaining means includes means for mounting said reinforcing element to said body shell and means for mounting said face plate to said body shell, said mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[20. A golf club, comprising the head set forth in claim 17, a flexible shaft having a proximal end and a distal end, and a grip, said head being connected to said distal end of said shaft and said grip being connected to said proximal end of said shaft.]

[21. The golf club head set forth in claim 17, wherein said face plate has a minimum yield strength of 40.0 ksi and a modulus of elasticity of $10\times10^3$14 $20\times10^3$ ksi.]

[22. The golf club head set forth in claim 21, wherein said reinforcing element includes:

(1) a support plate for engaging said face plate when said face plate is in said striking position;

(2) an arched backing member; and (3) spaced ribs for connecting said arched backing member to said support plate, said arched backing member and ribs serving to distribute load placed upon said support plate when striking a golf ball.]

[23. The golf club head set forth in claim 21, wherein said gap is between 0.001–0.30 inches thick.]

[24. The golf club head set forth in claim 21, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[25. A golf club, comprising the head set forth in claim 21, a flexible shaft having a proximal end and a distal end, and a grip, said head being connected to said distal end of said shaft and said grip being connected to said proximal end of said shaft.]

[26. The golf club head set forth in claim 17, wherein said reinforcing element includes:

(1) a support plate for engaging said face plate when said face plate is in said striking position;

(2) an arched backing plate; and (3) spaced ribs for connecting said arched backing member to said support plate, said arched backing member and ribs serving to distribute load placed upon said support plate when striking a golf ball.]

[27. The golf club head set forth in claim 1, wherein said face plate has a minimum yield strength of between 40 ksi and a modulus of elasticity of between $10\times10^3$–$20\times10^3$ ksi.]

[28. The golf club head set forth in claim 27, wherein said reinforcing element includes:

(1) a support plate for engaging said face plate when said face plate is in said striking position;

(2) an arched backing member; and (3) spaced ribs for connecting said arched backing member to said support plate, said arched backing member and ribs serving to distribute load placed upon said support plate when striking a golf ball.]

[29. The golf club head set forth in claim 27, wherein said gap is between 0.001–0.30 inches.]

[30. The golf club head set forth in claim 27, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[31. A golf club, comprising the head set forth in claim 27, a flexible shaft having a proximal end and a distal end, and a grip, said head being connected to said distal end of said shaft and said grip being connected to said proximal end of said shaft.]

[32. The golf club head set forth in claim 1, wherein said reinforcing element includes:

(1) a support plate for engaging said face plate when said face plate is in said striking position;

(2) an arched backing member to said support plate, said arched backing member and ribs serving to distribute load placed upon said support plate when striking a golf ball.]

[33. The golf club head set forth in claim 32, wherein said gap is between 0.001–0.30 inches thick.]

[34. The golf club head set forth in claim 32, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[35. A golf club, comprising the head set forth in claim 32, a flexible shaft having a proximal end and a distal end, and a grip, said head being connected to said distal end of said shaft and said grip being connected to said proximal end of said shaft.]

[36. The golf club head set forth in claim 1, wherein said gap is between 0.001–0.30 inches thick.]

[37. The golf club head set forth in claim 36, wherein said gap maintaining means includes means for mounting said reinforcing element to said body shell and means for mounting said face plate to said body shell, said face plate mounting means including:

(1) an z-shaped channel on said body shell;

(2) a cooperating z-shaped channel; and (3) a bendable mounting flange on said body shell for closing said z-shaped channel and capturing said mounting lug.]

[38. A golf club, comprising the head set forth in claim 37, a flexible shaft having a proximal end an a distal end, and a grip, said head being connected to said distal end of said shaft and said grip being connected to said proximal end of said shaft.]

[39. A golf club, comprising the head set forth in claim 36, a flexible shaft having a proximal end and a distal end, and a grip, said head being connected to said distal end of said shaft and said grip being connected to said proximal end of said shaft.]

[40. The golf club head set forth in claim 1, wherein said gap maintaining means includes means for mounting said reinforcing element to said body shell and means for mounting said face plate to said body shell, said face plate mounting means including:

(1) an z-shaped channel on said body shell;

(2) a cooperating z-shaped lug on said face plate for receipt in said z-shaped channel; and (3) a bendable mounting flange on said body shell for closing said z-shaped channel and capturing said mounting lug.]

[41. A golf club, comprising the head set forth in claim 1, a flexible shaft having a proximal end and a distal end, and a grip, said head being connected to said distal end of said shaft and said grip being connected to said proximal end of said shaft.]

*42. A head for a golf club including a top wall, a sole, side walls, and a striking face extending between said top wall and said sole, comprising:*

*a body shell having a front face;*

*a face plate held on said body shell for striking a golf ball, said face plate including a ball striking surface which is deflectable from a static position to a striking position as a result of stress produced when striking a golf ball;*

*a mounting flange about a periphery of said front face of said body shell including a channel formed therein; and*

*a cooperating lug extending from a periphery of said ball striking surface of said face plate for receipt in said channel of said mounting flange for securing said face plate to said body shell, such that said mounting flange and said striking surface of said face plate form said striking face of said head of said golf club.*

*43. The golf club head set forth in claim 42, wherein said channel and cooperating lug are z-shaped.*

*44. The golf club head set forth in claim 42, wherein a portion of said mounting flange is bendable.*

*45. A golf club, comprising the head set forth in claim 42, a flexible shaft having a proximal end and a distal end, and a grip, said head being connected to said distal end of said shaft and said grip being connected to said proximal end of said shaft.*

*46. The golf club head set forth in claim 42, wherein said body shell includes a cast top, sole and sidewalls.*

*47. A method for manufacturing a head for a golf club including a top wall, a sole, a side wall, and a striking face extending between said top wall and said sole, wherein said golf club comprises: a body shell having a front face; a face plate held on said body shell for striking a golf ball; a mounting flange about a periphery of said front face of said body shell including a channel formed therein; and a cooperating lug extending from a periphery of a ball striking surface of said face plate, comprising the following steps:*

*inserting said cooperating lug within said channel of said mounting flange such that a striking surface of said face plate is substantially aligned with said front face of said body shell; and*

*folding said mounting flange over said cooperating lug to securely retain said face plate to said front face of said body shell.*

*48. The method according to claim 47, wherein said mounting flange is folded over said cooperating lug such that said mounting flange and said striking surface of said face plate form said striking face of said head of said golf club.*

* * * * *